(12) United States Patent
Efraty

(10) Patent No.: US 8,025,804 B2
(45) Date of Patent: Sep. 27, 2011

(54) CONTINUOUS CLOSED-CIRCUIT DESALINATION METHOD WITHOUT CONTAINERS

(76) Inventor: Avi Efraty, Har Adar (IL)

( * ) Notice: Subject to any disclaimer, the term of this patent is extended or adjusted under 35 U.S.C. 154(b) by 0 days.

(21) Appl. No.: 12/714,981

(22) Filed: Mar. 1, 2010

(65) Prior Publication Data

US 2010/0270237 A1    Oct. 28, 2010

Related U.S. Application Data

(62) Division of application No. 11/630,297, filed on Dec. 19, 2006, now Pat. No. 7,695,614.

(51) Int. Cl.
*C02F 1/44* (2006.01)
(52) U.S. Cl. .......................... 210/652; 210/746; 210/805
(58) Field of Classification Search .................. 210/739, 210/746, 449, 805, 652
See application file for complete search history.

(56) References Cited

U.S. PATENT DOCUMENTS

| | | |
|---|---|---|
| 4,814,086 A | 3/1989 | Bratt |
| 4,983,301 A | 1/1991 | Szucz et al. |
| 5,647,973 A | 7/1997 | Desaulniers |
| 6,139,724 A | 10/2000 | Strohm et al. |
| 2004/0245175 A1 | 12/2004 | Godec et al. |

FOREIGN PATENT DOCUMENTS

| | | | |
|---|---|---|---|
| DE | 2622461 | A1 | 11/1977 |
| DE | 4331102 | A1 | 3/1995 |
| DE | 19520917 | A1 | 12/1996 |
| DE | 10112719 | A1 | 10/2002 |
| JP | 54101778 | A * | 8/1979 |
| WO | 02098527 | A2 | 12/2002 |
| WO | 03013704 | A2 | 2/2003 |
| WO | 2005016820 | A1 | 2/2005 |

OTHER PUBLICATIONS

English Translation of JP 54101778 A, Aug. 1979.*
Partial Supplementary European Search Report, EP 05754582, dated Jan. 18, 2010.

* cited by examiner

*Primary Examiner* — Terry Cecil

(57) ABSTRACT

A method for continuous closed-circuit consecutive sequential desalination of a salt water solution by reverse osmosis without using containers. The closed circuit includes one desalination module or more than one desalination modules connected in parallel. The method provides for desalination to proceed in concentrate recycling mode with brief intervals of concentrate discharge mode, in which pressurized concentrate in the closed circuit is replaced by pressurized fresh feed of salt water solution without stopping desalination.

5 Claims, 8 Drawing Sheets

CONTINUOUS CLOSED-CIRCUIT DESALINATION METHOD WITHOUT CONTAINERS

CROSS-REFERENCE TO RELATED APPLICATIONS

This application is a divisional of U.S. application Ser. No. 11/630,297, filed on Dec. 19, 2006, now U.S. Pat. No. 7,695,614, the disclosure of which is incorporated herein by reference.

BACKGROUND OF THE INVENTION

The present invention relates to a method and apparatus without containers for continuous consecutive sequential desalination in closed circuit of salt water solution by reverse osmosis.

DESCRIPTION OF THE PRIOR ART

Conventional reverse osmosis (RO) is carried out by means of hydrodynamic "plug flow" techniques, whereby, pressurized feed flow is split continuously into permeate and brine. A different approach that of hydrostatic desalination in closed circuit was first reported in the late eighties by Szuz et al. in U.S. Pat. No. 4,983,301 and by Bartt in U.S. Pat. No. 4,814,086, with emphasis placed on energy saving. According to the Closed Circuit Desalination (CCD) approach, the pressurized feed is recycled under hydrostatic pressure to the desired recovery, then brine is replaced with fresh and the batch process repeated. The aforementioned patents suggested the alternating engagement of two tanks in the closed circuit in order to enable continuous desalination. The principle drawback of this approach arises from the need of "two relatively large capacity tanks".

Szuz et al refer to the removal of "foreign materials by membrane filtration equipment, and therefore, apply to RO as well as to filtration of suspended particulate matter from solutions and fluids. Desalination or filtration in closed circuit involve a strong dilution effect during recycling, and therefore, facilitates the attainment of high recovery under relatively mild conditions.

A recent patent application WO 2005/016830 describes apparatus for continuous CCD with a single container. The current patent application describes a new inventive apparatus and method for continuous closed circuit desalination of salt water solution by a continuous consecutive sequential process without the need for containers.

SUMMARY OF THE INVENTION

The present invention proposes apparatus and methods for continuous desalination of salt water solution or brackish water feed (henceforth "feed") using closed circuit; wherein, concentrate is recycled by a circulation device through parallel modules comprise of one or more semi-permeable RO membrane elements; pressurized fresh feed supply device to said closed circuit to replace released permeate, and the valve device to enable brine released from said closed circuit at the desired recovery level without stopping the desalination process.

The apparatus and method according to the present invention for continuous desalination by a consecutives sequential process, can be made to operate under constant pressure of variable flux and flow of permeate, or under variable pressure of constant flux and flow of permeate as result of fixed Net Driving Pressure (NDP). The NDP, the difference between applied pressure and osmotic pressure, at each stage during the operation of the inventive apparatus is controlled above a predefined minimum value.

The apparatus and method according to the present invention can be made available in a modular form with pressurized feed centrally created and supplied simultaneously to more than one modular unit. The modular form of the apparatus may apply to desalination plants of any production capacity.

The apparatus and method according to the present invention can contain commercial components and parts, which are actuated without exceeding their stated specifications.

The apparatus and method according to the present invention are characterized by simple inexpensive designs with relatively few power components, reduced number of membrane elements and low specific energy demand without any need for energy recovery. The inventive method may be found specifically attractive for high desalination recovery (about 75%-95%) of low concentration brackish water, and in this context may provide a simple cost effective approach to the partial removal of Boron from SWRO permeates to the acceptable level (about <0.5 ppm).

DETAILED DESCRIPTION OF THE INVENTION

Figure 1A:
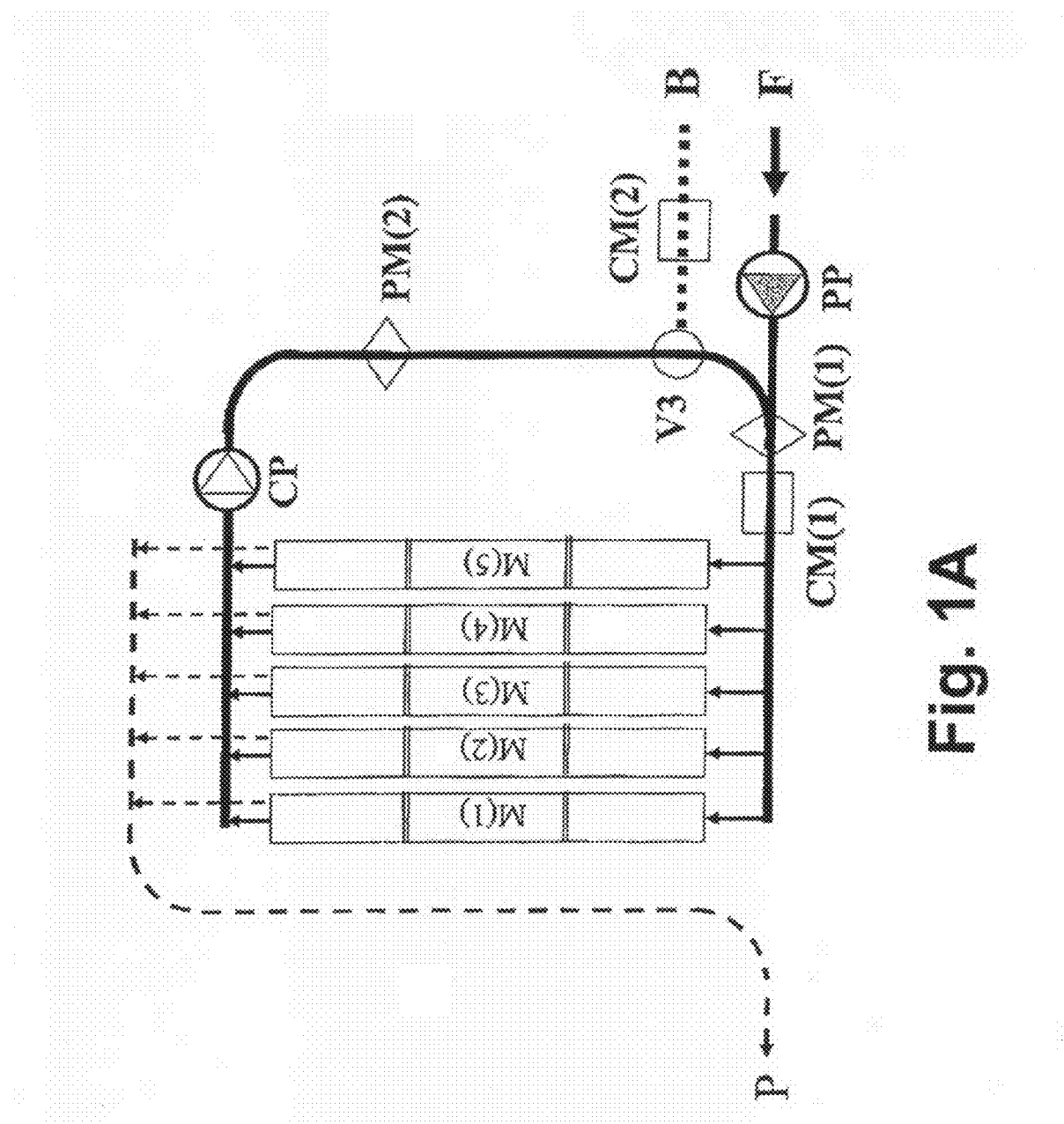
FIG. 1A is a schematic diagram of the inventive apparatus for desalination in closed-circuit with five modules each of three membrane elements (M5E15 configuration) during the concentrate recycling mode, in accordance with a preferred embodiment of the present invention.

The preferred embodiment of the inventive RO apparatus in FIG. 1A comprises a closed-circuit desalination system with 5 modules ($M_1$, $M_2$, $M_3$, $M_4$ and $M_5$) each of 3 membrane elements, feed inlet (F), feed pressurizing pump (PP), circulation pump (CP), brine effluent outlet (B), permeate outlet (P), a three-way valve (V3), solution conductivity monitoring devices (CM(1) and CM(2)) and pressure monitoring devices (PM(1) and PM(2)). In FIG. 1A, the conducting lines for fresh feed, mixed with concentrate or not, are indicated by solid lines, the conducting line for brine removal by a dotted line and the conducting lines for permeate collection by dashed lines. The directions of flow in the various lines are indicated by arrows. The volume of the closed circuit is derived form the volume of concentrate contained in the pressure vessels, also known as modules, and the pipes and the desired closed circuit volume is designed with the appropriate selection of diameters of pipe lines. The configuration depicted in FIG. 1A is that of the concentrate recycling mode which is experienced during most of the time in this inventive apparatus.

Figure 1B:
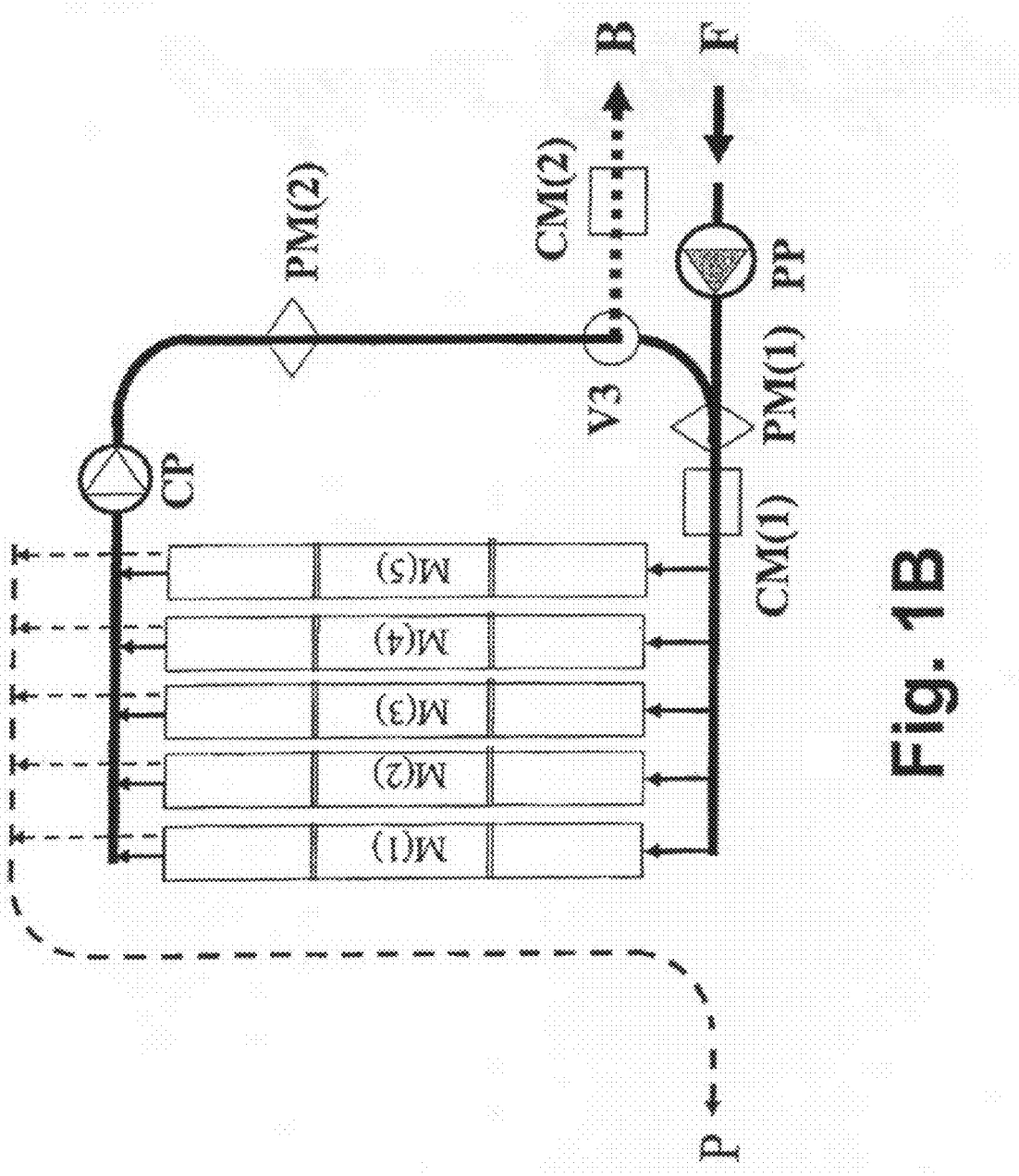
FIG. 1B is a schematic diagram of the inventive apparatus for desalination in closed-circuit with five modules each of three membrane elements (M5E15 configuration) during the concentrate discharge mode, in accordance with a preferred embodiment of the present invention.

The continuous consecutive sequential desalination in the inventive apparatus requires periodical replacement of brine concentrate with fresh feed in the closed circuit at the desired system recovery level and this brief mode of operation is depicted in FIG. 1B. Brine rejection from the closed circuit is achieved by diverting the concentrate flow to the outside through the three-way valve V3. The control of the entire desalination process is achieved by means of "on line" monitored conductivity with a signal form CM(1) that manifests reaching the desired recovery level deactivating recycling in favor of brine rejection; and likewise, a signal form CM(2) that manifests brine rejection completion reactivating the recycling mode.

The pressure monitoring devices PM(1) and PM(2) in the inventive apparatus under review provide the means for pressure control especially during the brine rejection mode (FIG. 1B), with a minimum pressure change in the system attained by means of valve actuation in response to undesirable "on line" pressure variations.

Figure 2A:
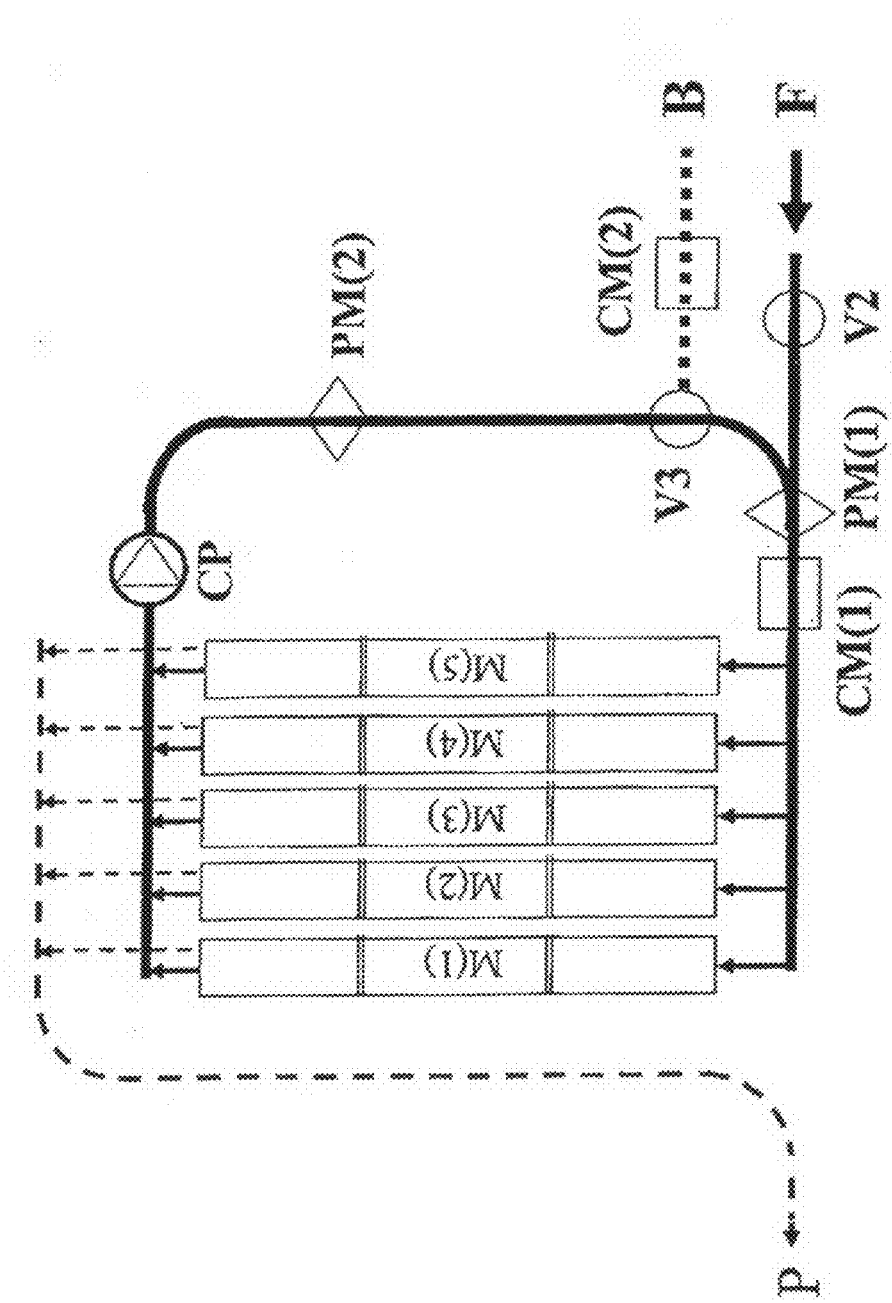
FIG. 2A is a schematic diagram of the inventive modular unit of the apparatus for desalination in closed-circuit with five modules each of three membrane elements (M5E15 configuration) during the concentrate recycling mode, in accordance with a preferred embodiment of the present invention.
Figure 2B:
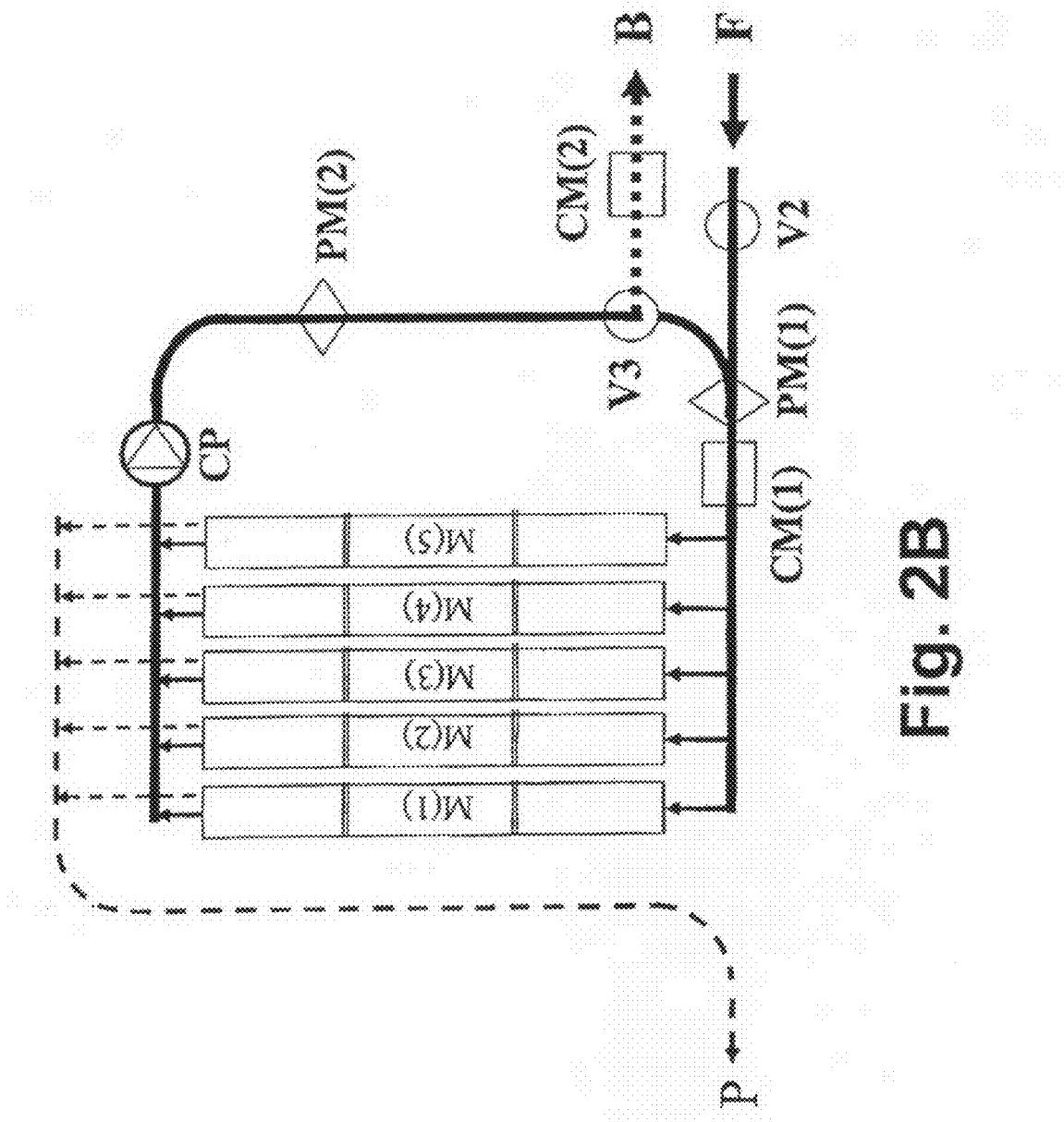
FIG. 2B is a schematic diagram of the inventive modular unit of the apparatus for desalination in closed-circuit with five modules each of three membrane elements (M5E15 configuration) during the concentrate discharge mode, in accordance with a preferred embodiment of the present invention.

The preferred embodiment of the modular unit of the inventive apparatus displayed in FIGS. 2 (A and B) contains no pressurizing means and the purpose of the two-way valve V2 in this design is to enable the isolation of a specific modular units for maintenance and/or repair without stopping the operation of the remaining units in the array. By analogy with FIG. 1A and FIG. 1B, the functions described by FIG. 2A and FIG. 2B are of recycling and brine rejection, respectively.

Figure 3:
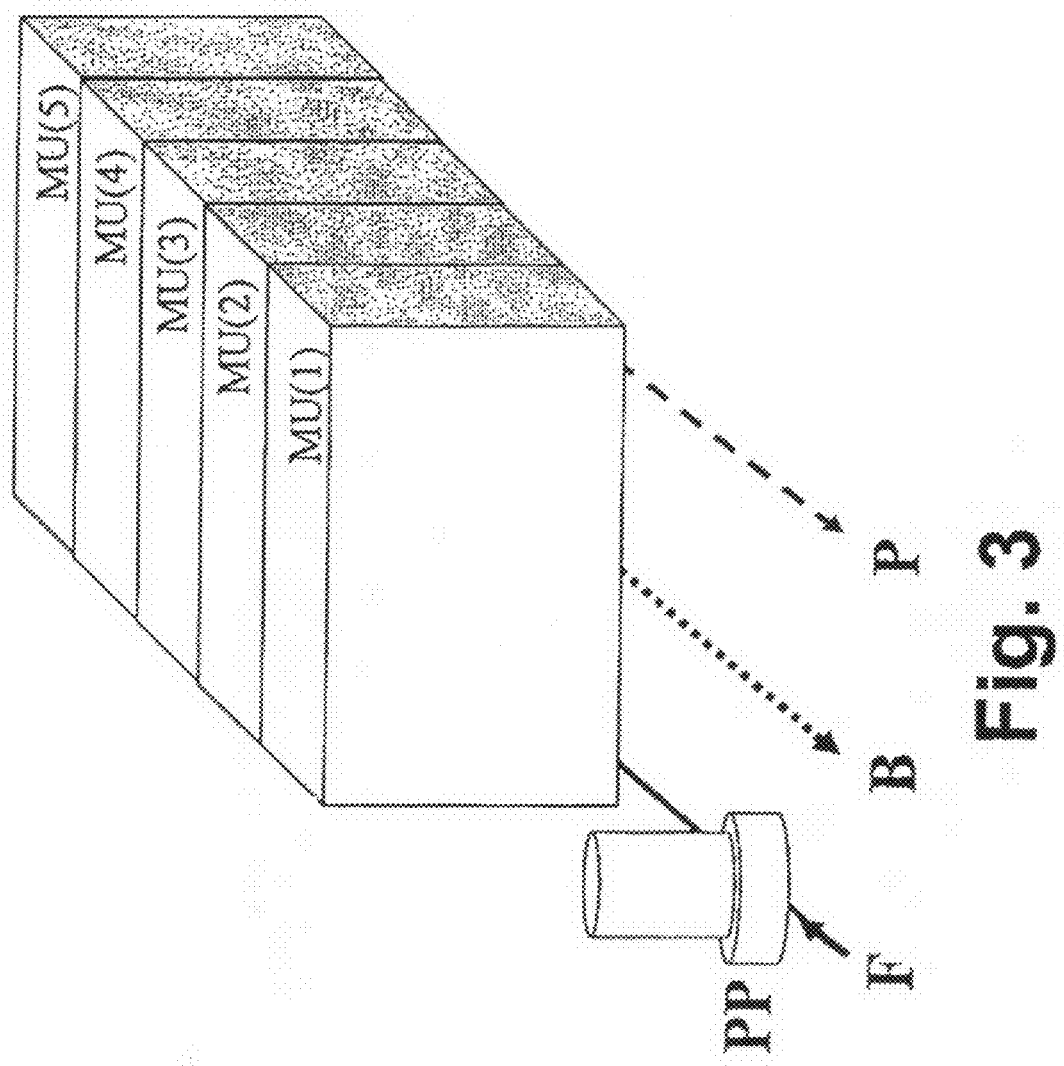
FIG. 3 is a schematic diagram of a plant made of five modular units of the inventive apparatus, each of 5 modules and 15 membrane elements, in accordance with a preferred embodiment of the present invention.

The combining of five modular units of the preferred embodiments depicted in FIGS. 2 (A and B) into a desalination plant, with its feed pressurizing device, is displayed in FIG. 3. The five modular units (MU-1, MU-2, MU-3, MU-4 and MU-5) in FIG. 3 are centrally supplied through the same conducting line (F) with pressurized feed received from PP, and similar such conducting lines are used for the collection of permeate (P) and for the removal of brine (B). The preferred mode of operation of plants comprised of modular units by the inventive method is that under constant pressure conditions, although variable pressure operation can be made possible provided each of the modular units in the array is also equipped with a variable pressure booster whereby the desired pressure variations are discretely created per modular unit.

It will be understood that the design of the preferred embodiments of the inventive apparatus and modular desalination units shown in FIGS. 1 (A and B), FIGS. 2 (A and B) and FIG. 3 are schematic and simplified and are not to be regarded as limiting the invention. In practice, the desalination units and apparatus according to the invention may comprise many additional lines, branches, valves, and other installations and devices as necessary according to specific requirements while still remaining within the scope of the inventions and claims.

All the preferred embodiments depicted in FIG. 1-3 display basic desalination apparatus and modular units made of five modules (pressures vessels) with three membrane elements per module, and this for the purpose of simplicity, clarity, uniformity and the convenience of presentation. It will be understood that the general design according to the invention is neither limited nor confined to five modules per modular unit and/or apparatus and that the number of membrane elements per module is not confined to three. Specifically, it will be understood that apparatus and modular units according to the invention method may be comprised of n modules (M(1), M(2), M(3) ... M(n)). Likewise, it will be understood that each module may contain according to the invention method m membrane elements (1E, 2E, 3E ... mE).

The scope of the invention is neither confined nor limited to the design and construction of desalination plants that comprise 5 modular units according to the preferred embodiment describe by FIG. 3. It will be understood that desalination plants according to the inventive method may be made of any desired number of the inventive modular units and that such plants are also within the scope of this invention.

Feed pressurizing devices for apparatus and plants made of modular units according to the inventive method may be comprised of variable flow constant pressure pumps, or of constant flow variable pressure pumps, depending on the desired mode of operation of the designed system. It will be understood that feed pressurizing devices according to the invention may be comprised of a suitable single pump, or instead, of several suitable pumps that are applied simultaneously in parallel.

Concentrate recycling through the closed circuit of the apparatus and modular units of the inventive method is done by circulation systems. It will be understood that the circulation systems according to the invention may be comprised of a suitable single circulation pump, or instead, of several circulation pumps, applied simultaneously in parallel and/or in line.

It will be obvious to those versed in the art that the inventive desalination method under review may be operated in modular units and/or non-modular desalination apparatus of different designs, as already explained above in respect of the inventive apparatus and/or units, as long as such apparatus and/or units comprise a closed circuit of conducting lines with one or more parallel modules each with one or more membrane elements; circulation systems; feed pressurizing devices; permeate collection lines; brine removal lines; conductivity monitoring devices, and pressure monitoring devices Advantages offered by the inventive method and apparatus are as followed: Simple designs without staging and interstage booster pumps.

Apparatus made only of durable commercial components and parts.

Apparatus actuated without exceeding specifications of components.

Method saves on pressurization means.

Method saves on membrane elements.

Method saves on energy without need for energy recovery.

Method saves on operational expenses and maintenance costs.

Method affords permeate of low salt content.

Method suitable for boron removal form SWRO permeates.

While the invention has been described hereinabove in respect to particular embodiments, it will be obvious to those versed in the art that changes and modifications may be made without departing form this invention in its broader aspects, therefore, the appended claims are to encompass within their scope all such changes and modifications as fall within the true spirit of the invention.

EXAMPLE

The preferred embodiment of the inventive method is exemplified with a high desalination recovery (85%-95%) of a typical SWRO permeate feed with TDS of 391 ppm that contain B (1.2 ppm) and Mg (3.4 ppm). This example illustrates, amongst others, the application of the inventive method for the reduction of Boron level in SWRO permeates to an excepted level (<0.5 ppm) by international standards.

The exemplified apparatus is of the schematic design displayed in FIGS. 1 (A and B) with five 8" pressure vessels (modules) each of three membrane elements. The performance specifications under Test Conditions (TC) of the low energy commercial type elements considered in the context of the exemplified apparatus are as followed: Production, 44 m$^3$/day; Feed, 2,000 ppm NaCl; Pressure, 150 psi; Net Driving Pressure (NP), 8,8 bar; Temperature, 25° C.; and Maximum Element Recovery (MER), 15.0%. The exemplified apparatus is operated under variable pressure conditions of fixed NDP (8.8 bar) in the actual consecutive sequential pressure range for 95% recovery of 9.1-12.3 bar. The consecutive sequential desalination period for 95% recovery is of 6.0 minutes and the duration of brine replacement with fresh feed takes about 19 seconds. The fixed modular recovery under the above specified operating conditions is of 37.8% with an Average Element Flow (AEF) of 36.9 m$^3$/day, or 83.9% of the rated element flow under TC.

The closed circuit volume of the exemplified apparatus is 122 liters, the flow rate of the pressurizing pump (PP) is 23.1 m$^3$/h and that of the circulation pump (CP) 38.0 m$^3$/h. The calculated specific energy for 95% recovery of the exemplified apparatus is 0.45 kWh/m$^3$, assuming efficiency of 85% for both the PP and CP.

The desalination production rate of the exemplified apparatus is 23.1 m$^3$/h or 554 m$^3$/day or 202,210 m$^3$/year with rate of disposed Brine of 1.2 m$^3$/h or 29 m$^3$/day.

Figure 4:
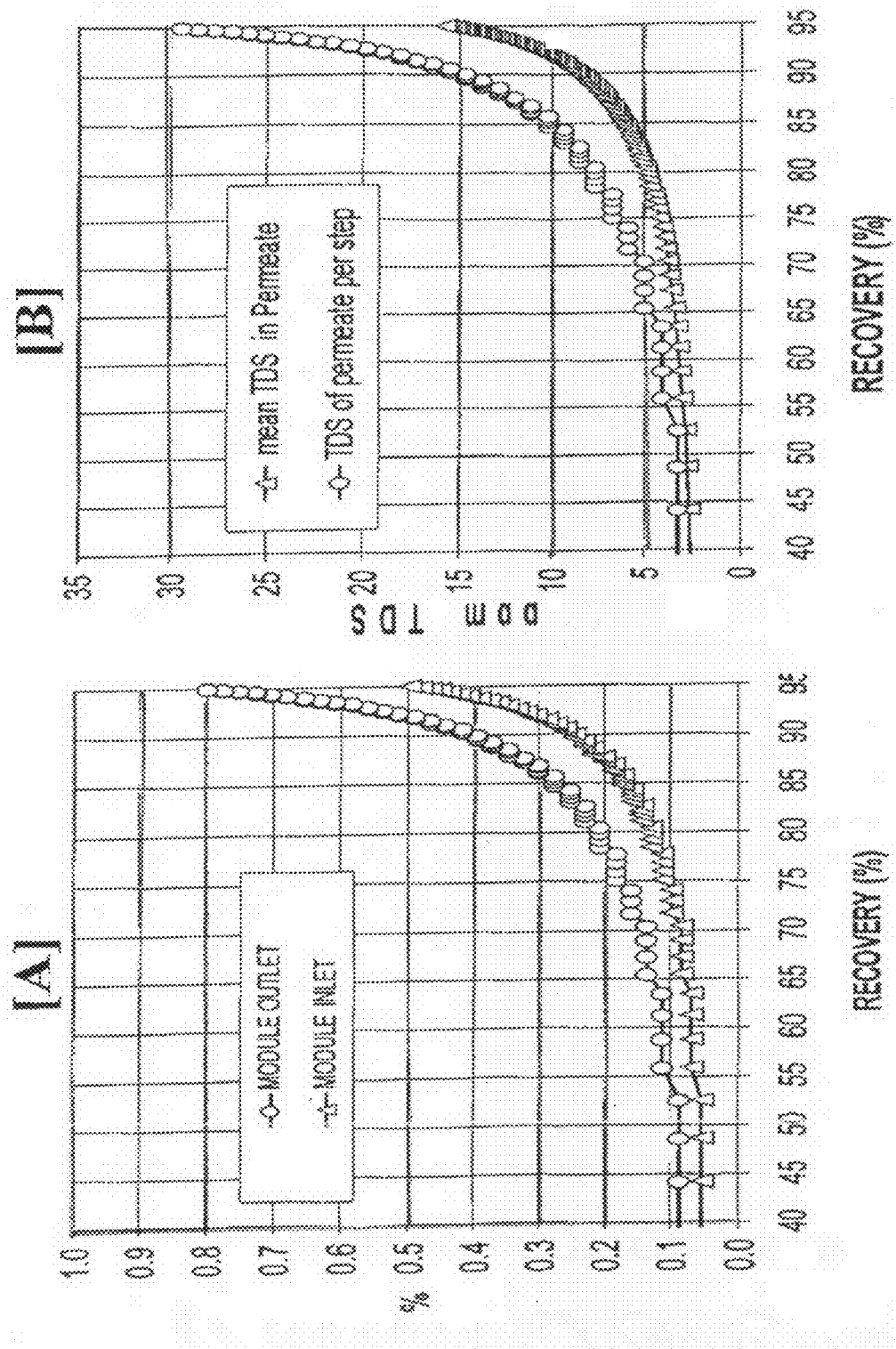
FIGS. 4A and 4B are graphs depicting simulated module inlet and outlet TDS concentrations, and permeate TDS concentrations respectively during an exemplified high percent recovery CCD process in accordance with a preferred embodiment of the present invention.
Figure 5:
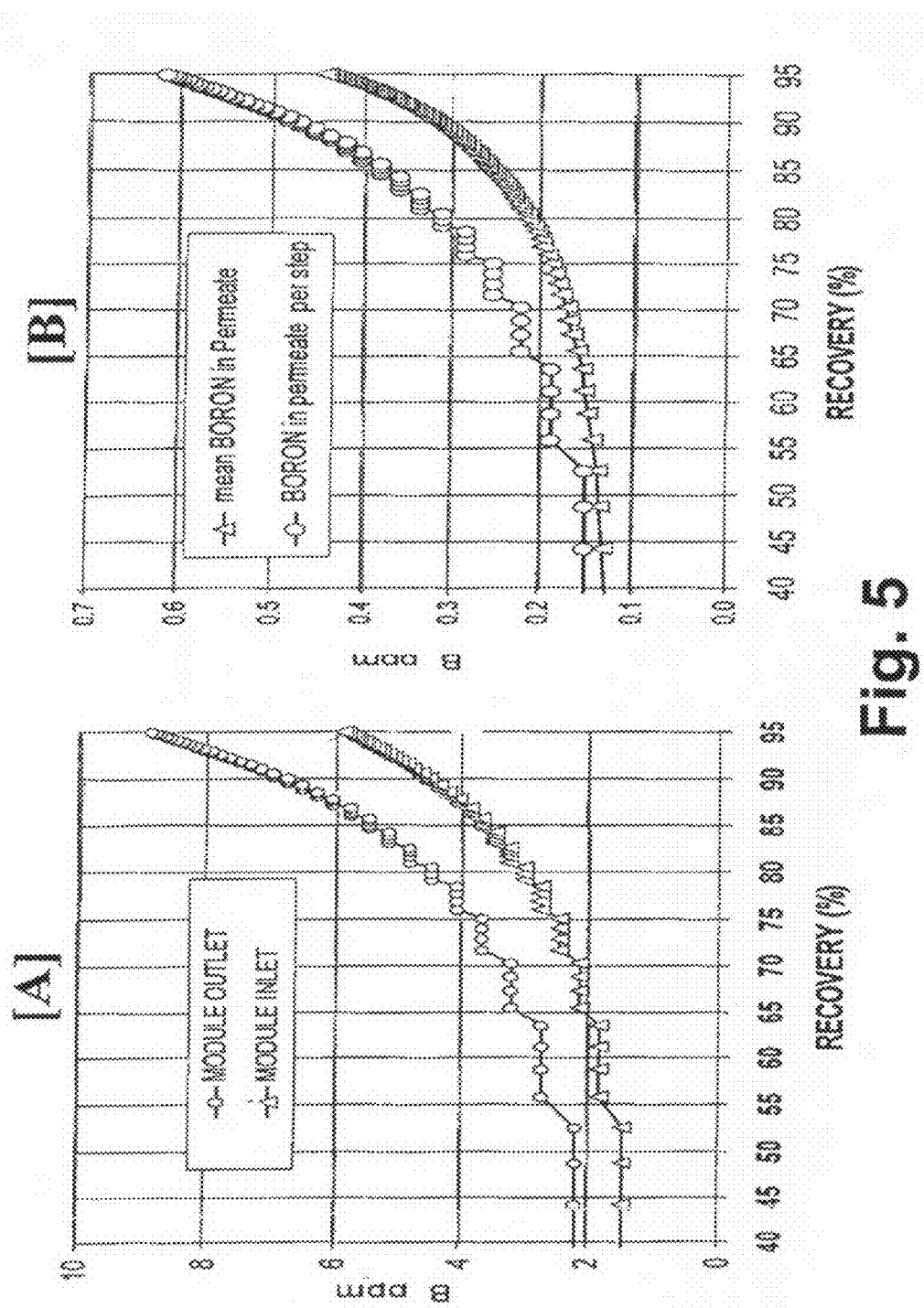
FIGS. 5A and 5B are graphs depicting simulated module inlet and outlet Boron concentrations, and permeate Boron concentrations, respectively, during the exemplified high percent recovery CCD process demonstrated in FIG. 4.
Figure 6:
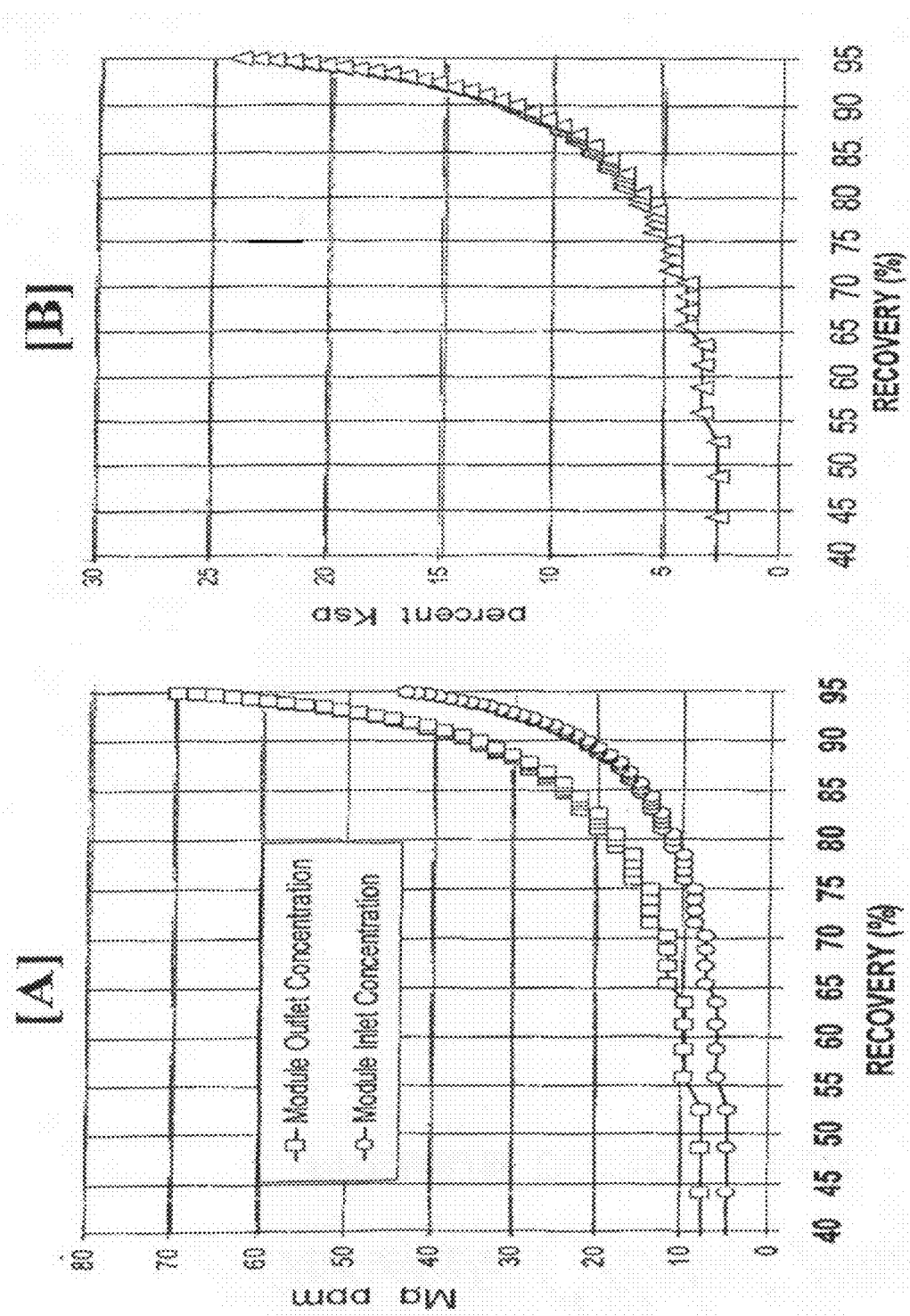
FIG. 6A is a graph depicting simulated module inlet and outlet Magnesium concentrations and FIG. 6B is a graph depicting the percent of solubility of Magnesium with respect to Ksp of $Mg(OH)_2$ during the same exemplified high percent recover CCD process as of FIGS. 4 and 5.

The computer simulated performance of the exemplified apparatus displayed in FIG. 4-6 presume operation at pH~10 with salt rejection of 99.5% and boron rejection of 93.0%. Operation at pH>10 with greater boron rejection is restricted by the presence of Mg, since its Mg(OH)$_2$ derivative is highly insoluble (Ksp=1.2×10$^{-11}$ at 18° C.).

FIG. 4A shows a module inlet and outlet percent concentrations (TDS) as function of desalination recovery (maximum 95%) at pH~10 in the example under review and illustrates the strong dilution effect created during closed circuit desalination. The quality of permeates received in the example under review as function of desalination recovery are projected in FIG. 4B. Module inlet and outlet boron concentrations during the exemplified process are revealed in FIG. 5A and the quality of permeates received in reference to boron displayed in FIG. 5B. Noteworthy are the permeate mean boron concentrations 0.22, 0.24, 0.32 and 0.44 ppm in the exemplified process during desalination recoveries of 80%, 85%, 90% and 95%, respectively, which are below the recommended level of 0.5 ppm. Module inlet and outlet magnesium concentrations during the exemplified process are revealed in FIG. 6A and the percent solubility products of [Mg$^{+2}$] and [OH$^-$] in reference to the Ksp of Mg(OH)$_2$, displayed in FIG. 6B, reveal maximum of ~24% which means that no magnesium hydroxide precipitation occurs during the exemplified process.

The invention claimed is:

1. A method for continuous consecutive sequentially closed circuit desalination of salt water solution by reverse osmosis using at least one closed circuit comprising one desalination module having an inlet, a permeate outlet and a concentrate outlet, or two or more desalination modules having their respective inlets and outlets connected in parallel, wherein said closed circuit comprises no containers, the method comprising:

continuously supplying a pressurized fresh feed of salt water solution to said at least one closed circuit at a pressure sufficient to enable effective reverse osmosis desalination and replacement of released permeate by fresh feed of salt water solution in said at least one closed circuit;

recycling pressurized concentrate by means of at least one circulation system from the concentrate outlet to the inlet of said one desalination module, or from the concentrate outlets to the inlets of the two or more desalination modules, after mixing with said pressurized fresh feed of salt water solution;

continuously collecting permeate from said one or more desalination modules;

monitoring progress of desalination in said at least one closed circuit;

upon detection of a desired desalination recovery level in said closed circuit, diverting flow of said pressurized concentrate outside said closed circuit without stopping desalination until concentrate in the closed circuit is substantially completely replaced by fresh feed of salt water solution; and upon detection that replacement of concentrate by fresh feed of salt water solution is complete, switching back to concentrate recycling mode in which pressurized concentrate is entirely recycled from the concentrate outlet to the inlet of the one desalination module, or from the concentrate outlets to the inlets of the two or more desalination modules, and released permeate is replaced by pressurized fresh feed of salt water solution;

whereby, most of the time desalination proceeds in concentrate recycling mode, in which only released permeate is replaced by fresh feed of salt water solution while pressurized concentrate is recycled through the closed circuit, with brief intervals of concentrate discharge mode, in which pressurized concentrate in said closed circuit is replaced by pressurized fresh feed of salt water solution without stopping desalination.

2. The method of claim 1 wherein the concentrate recycling mode is performed with fixed permeate flow under variable pressure.

3. The method of claim 1 wherein the concentrate recycling mode is performed with variable permeate flow under constant pressure.

4. The method of claim 1 wherein said salt water solution comprises any one of the following: potable water sources; saline water sources; contaminated water sources; saline and contaminated water sources; clear domestic effluents sources; clear industrial effluents sources; clear effluents from cooling towers of central air condition units; high boron SWRO permeates; or brackish water sources with total salinity up to 8,000 ppm.

5. The method of claim 1 wherein two or more closed circuits are combined by sharing the same feed pressurizing device and the same conducting lines for permeate collection and for brine effluent.

* * * * *